United States Patent [19]

Landrum

[11] Patent Number: 5,613,516
[45] Date of Patent: Mar. 25, 1997

[54] COMBINATION HYDRAULIC PRESSURE REGULATOR AND PRESSURE SWITCH

[75] Inventor: Michael T. Landrum, Waseca, Minn.

[73] Assignee: Power Team Division of SPX Corporation, Owatonna, Minn.

[21] Appl. No.: 576,709

[22] Filed: Dec. 21, 1995

[51] Int. Cl.[6] .............................. F16K 17/06; F16K 37/00
[52] U.S. Cl. ........................... 137/509; 137/554; 137/557
[58] Field of Search .................................... 137/509, 554, 137/557

[56] References Cited

U.S. PATENT DOCUMENTS 5,551,475  9/1996  Nelson et al. ........................... 137/509

*Primary Examiner*—Gerald A. Michalsky
*Attorney, Agent, or Firm*—Wood, Phillips, VanSanten, Clark & Mortimer

[57] ABSTRACT

A combination hydraulic pressure regulator and pressure switch includes a housing having an interior chamber connecting an inlet port to an outlet port. A seating device is movably received in the interior chamber and has a seat surrounding an opening. The opening is in communication with the outlet port. A poppet is movable in the interior chamber. An adjustment spring normally urges the poppet into engagement with the seat to close the opening, the poppet being movable in a direction away from the seat in response to hydraulic pressure in the interior chamber sufficient to overcome the force of the adjustment spring. A limit switch is mounted to the body. A switch actuator is associated with the poppet for actuating the limit switch in response to movement of the poppet in a direction away from the seat. The seating device is hydraulically balanced in the chamber so that the seat remains engaged with the poppet until a select pressure is exceeded in the interior chamber, thereafter resulting in hydraulic flow from the inlet port to the outlet port.

20 Claims, 1 Drawing Sheet

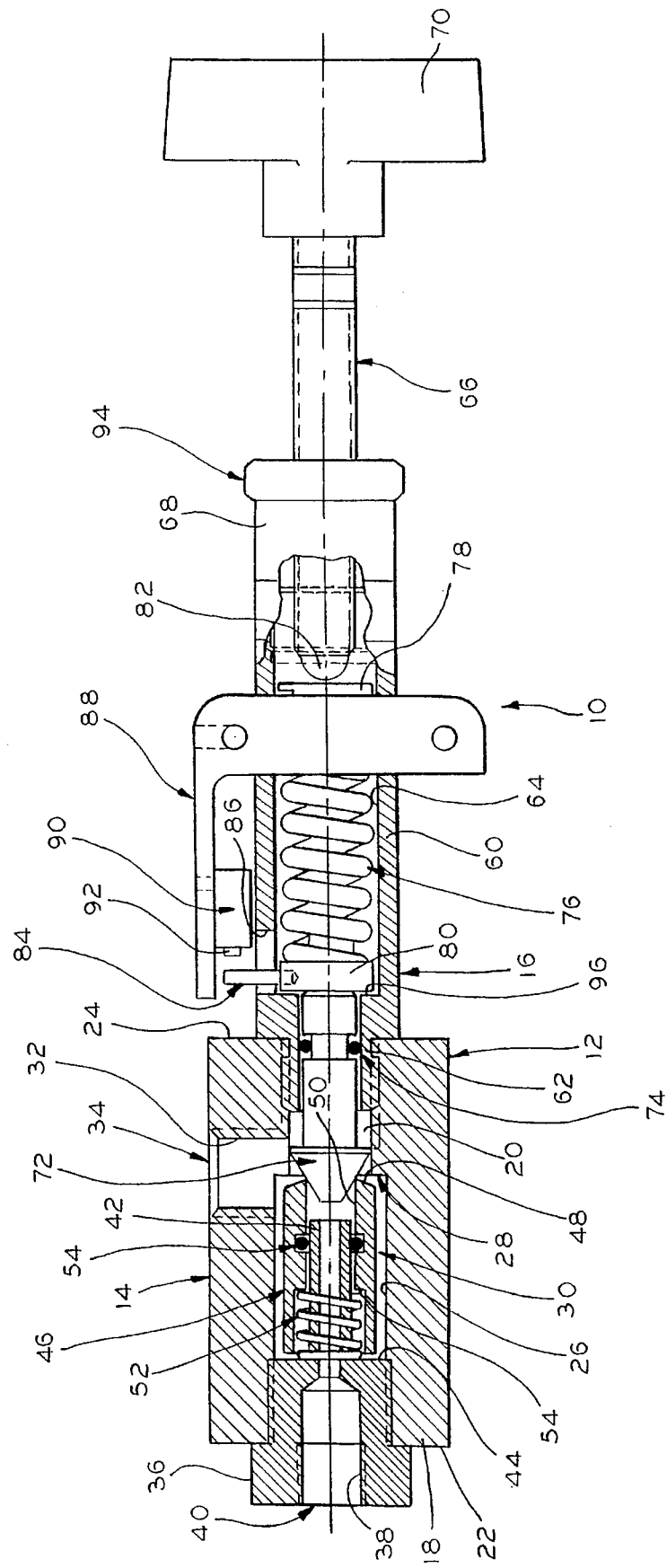

COMBINATION HYDRAULIC PRESSURE REGULATOR AND PRESSURE SWITCH

FIELD OF THE INVENTION

This invention relates to hydraulic power systems and, more particularly to a combination hydraulic pressure regulator and pressure switch.

BACKGROUND OF THE INVENTION

Hydraulic power systems utilize hydraulic pressure for controlling power units. For safety and other considerations, these systems often use a pressure switch to provide an electrical signal indicating that a preset pressure has been met and a separate pressure regulator to protect the system against being over-pressurized. There also exists combined pressure regulator and pressure switches which provide both pressure signal and protection in a single unit.

The use of separate pressure switches and pressure regulators creates the problems of a user having to make two separate pressure adjustments—one adjustment for the pressure switch, and a separate adjustment for the pressure regulator. This can be difficult since the two are somewhat interactive. If the pressure regulator is set too low, then the pressure switch cannot be set. If the pressure regulator is set too high to avoid this situation, then there is no protection against over-pressurization during the setup operation. Likewise, if the pressure switch is set too low, then the power unit can shut off before the pressure regulator can be set. Thus, the setup operation, in using separate pressure switch and pressure regulators, is especially difficult when operating pressure of the system is constantly changing, requiring repeated resets.

Other problems exist with combined pressure regulators and pressure switches. These devices typically route the return hydraulic flow from the pressure regulator through an orifice, thus creating a back pressure to trigger a pressure switch. This eliminates the need for two separate pressure settings. However, because this design utilizes an orifice, there is the potential for malfunction due to contamination clogging the orifice. Also, operation can be sluggish due to oil viscosity during cold weather operation, or malfunction in hot weather operation. Because the pressure switch is triggered by the return oil from the pressure regulator, the switch can prematurely trigger if the hydraulic seat in the pressure regulator becomes worn.

The present invention is directed to solving one or more of the problems discussed above in a novel and simple manner.

SUMMARY OF THE INVENTION

In accordance with the invention there is provided a combination hydraulic pressure regulator and pressure switch using a hydraulically balanced floating seat which forces a measurable amount of seat movement prior to the pressure regulator losing any pressure or flow.

Broadly, there is disclosed herein a combination hydraulic pressure regulator and pressure switch including a housing having an interior chamber connecting an inlet port to an outlet port. A seating device is movably received in the interior chamber and has a seat surrounding an opening. The opening is in communication with the outlet port. A poppet is movable in the interior chamber. An adjustment spring normally urges the poppet into engagement with the seat to close the opening, the poppet being movable in a direction away from the seat in response to hydraulic pressure in the interior chamber sufficient to overcome the force of the adjustment spring. A limit switch is mounted to the body. A switch actuator means is associated with the poppet for actuating the limit switch in response to movement of the poppet in a direction away from the seat. Balancing means hydraulically balance the seating device in the chamber so that the seat remains engaged with the poppet until a select pressure is exceeded in the interior chamber, thereafter resulting in hydraulic flow from the inlet port to the outlet port.

In accordance with one aspect of the invention the seating device is movable between opposite first and second shoulders in the interior chamber. The balancing means prevent the seating device from engaging the first shoulder so that the force of the adjusting spring is not exerted against the seating device. The second shoulder limits movement of the seating device so that when the select pressure is exceeded the poppet is spaced from the seat, resulting in hydraulic flow from the inlet port to the outlet port.

In accordance with another aspect of the invention the balancing means comprises a spring biasing the seating device in a direction toward the poppet.

In accordance with a further aspect of the invention, an adaptor is receivable in the interior chamber and has a throughbore defining the outlet port. The adaptor has an elongate seat guide end supporting the seating device in the interior chamber. The seating device comprises a tubular body telescopically received on the seat guide. A seal is provided between the tubular body and the seat guide.

In accordance with yet another aspect of the invention the switch actuator means comprises a spring guide disposed between the poppet and the adjustment spring for movement with the poppet. The spring guide has a protruding pin for selectively engaging an actuator on the limit switch.

In accordance with an additional aspect of the invention, means are provided for adjusting force of the adjustment spring.

There is further disclosed herein a combination hydraulic pressure regulator and pressure switch including a housing having an interior chamber connecting an inlet port to an outlet port. A floating seating device is received in the interior chamber and has a seat surrounding an opening. The opening is in communication with the outlet port. A poppet is movable in the interior chamber. An adjustment spring normally urges the poppet into engagement with the seat to close the opening. The poppet is movable in a direction away from the seat in response to hydraulic pressure in the interior chamber sufficient to overcome force of the adjustment spring. A limit switch is mounted to the body. A switch actuator means is associated with the poppet for actuating the limit switch in response to movement of the poppet in a direction away from the seat. Biasing means bias the seating device toward the poppet so that the seat remains engaged with the poppet to prevent loss of hydraulic pressure until a select pressure is exceeded in the interior chamber, thereafter resulting in hydraulic flow from the inlet port to the outlet port.

Further features and advantages of the invention will be readily apparent from the specification and the drawing.

BRIEF DESCRIPTION OF THE DRAWING

The drawing comprises a single figure including a partial sectional view of a combination hydraulic pressure regulator and pressure switch according to the invention.

DETAILED DESCRIPTION OF THE INVENTION

With reference to the drawing figure, there is illustrated a combination hydraulic pressure regulator and pressure switch device 10 according to the invention. The device 10 uses a hydraulically balanced floating seat to permit both pressure switch setting and pressure regulator settings to be made with the same adjustment and results in a design in which adjusting spring forces are never exerted against the hydraulic seat.

The device 10 includes a two-piece housing 12. The housing 12 includes a valve housing 14 and a spring housing 16. The valve housing 14 comprises a cylindrical body 18 having a throughbore 20 extending from an outlet end 22 to a regulating end 24. An axial counterbore 26 is provided at the outlet end 22 and defines a shoulder 28. The throughbore 20 defines an interior chamber 30. A radially extending threaded bore 32 opens into the interior chamber 30. An axis of the threaded bore 32 is longitudinally positioned relative to the interior chamber 30 so that it is positioned proximately at the shoulder 28. The bore 32 defines an inlet port 34.

A cylindrical adapter 36 is threaded into the counterbore 26 at the outer end 22. The adapter 36 includes a throughbore 38 opening into the interior chamber 30 and defining an outlet port 40. The adapter 36 includes a narrowed elongate seat guide 42 extending into the interior chamber 30 and defining a shoulder 44. A floating seat 46 comprises a tubular body telescopically received on the adapter seat guide 42. The floating seat 46 is movably received in the interior chamber 30 and has a seat 48 surrounding an opening 50 in communication with the outlet port 40. A seat spring 52 surrounds the seat guide 42 and extends between the adapter shoulder 44 and an interior shoulder 54 in the seat opening 50 to bias the floating seat 46 away from the outlet port 40. An O-ring seal 54 seals the floating seat 46 and the adapter 36.

The spring housing 16 comprises a cylindrical body 60 having a narrowed valve end 62 threadably received in the valve housing bore 20 at the regulating end 24. The spring housing 16 includes a counterbore 64 opening into the valve housing interior chamber 30. An adjusting screw 66 is threadably received in a distal end 68 of the spring housing 16 and is moved toward and away from the valve housing 12 as a result of rotation of a knob 70.

A poppet 72 is received primarily in the valve body interior chamber 30 and extends into the spring housing 16. The poppet 72 is sealed in the spring housing 16 using an O-ring poppet seal 74. The poppet 72 is movable in the interior chamber 30.

An adjustment spring 76 in the spring housing 16 is sandwiched between opposite spring guides 78 and 80. An end 82 of the adjusting screw 66 engages the first spring guide 78. The second spring guide 80 is disposed between the poppet 72 and the adjustment spring 76. The adjustment spring 76 normally urges the poppet 72 into engagement with the seat 48 to close the seat opening 50.

A pin 84 extends radially from the second spring guide 80 and out an opening 86 in the spring housing 16. A switch bracket 88 mounted to the spring housing 16 supports a limit switch 90. The pin 84 is operable to selectively actuate an actuator 92 on the switch 92 depending on the axial position of the second spring guide 80, and thus pin 84. Although not shown, the limit switch includes electrical contacts actuated in response to movement of the actuator 92, as is well known. The contact(s) can be connected to external circuits to provide an electrical signal indicating that a preset pressure has been met.

The settings of the pressure regulator and pressure switch device 10 are selected by rotating the knob 70, as is apparent, to adjust compression of the adjustment spring 76, and thus force on the poppet 72. The setting can be retained by tightening a locking nut 94 to prevent rotation of the knob 70.

In operation, hydraulic flow is introduced into the device 10 via the inlet port 34. Hydraulic flow is sealed by the seat seal 54 and the poppet seal 74, and is prevented from leaving the chamber 30 by the seal created by the floating seat 46 and the poppet 72.

As flow is introduced into the inlet port 34, pressure begins to build in the interior chamber 30. The effective area of the poppet 72 and the poppet seal 74 is slightly larger than the effective area of the floating seat 46 and its seal 54. Therefore, the pressure increase will continue until enough hydraulic force is created to overcome the force of the adjusting spring 76 which has been preset by the adjusting screw 66. When sufficient force is present to overcome the force of the adjusting spring 76, then the poppet 72 begins to move in a direction away from the seat 46, that is, toward the spring housing 16. However, there is no loss of hydraulic pressure as in conventional regulators at this point, because the floating seat 46 is hydraulically balanced and is forced to follow the poppet 72 by the force of the seat spring 52. Therefore, the floating seat 46 and the poppet 72 move toward the spring housing 16 together. Because the second spring guide 80 and pin 84 are situated between the poppet 72 and the adjustment spring 76, they also move in the same direction.

As hydraulic pressure further increases, the movement of the poppet 72 causes the spring guide pin 84 to actuate the limit switch 90. A resulting electrical signal from the limit switch 90 can then be transferred to an appropriate electrical control (not shown) in a normal manner. As pressure further increases, further movement of the floating seat 46 will be stopped by the shoulder 28. Any further increase in hydraulic pressure causes the poppet 72 to move toward the spring housing 16 and away from the floating seat 46. At this point, hydraulic flow is directed through the floating seat opening 50, the adaptor bore 38 and to the outlet port 40, therefore regulating the hydraulic pressure at this select level.

The position of the limit switch 90 is determined by varying position of the bracket 88. This is done at initial setup to allow for necessary tolerances in operation. The spacing between the switch actuator 92 and pin 84 in the normal or shelf state is selected to be slightly less than the normal spacing between the seat 48 and the shoulder 28. As a result, the switch 90 is tripped prior to providing pressure regulation. However, the difference in spacing is sufficiently small so that the two actions occur almost simultaneous.

The spring guide 80 is stopped by a shoulder 96 of the spring housing 16. This prevents the poppet 72 from moving toward the seat guide 42 with enough movement to bring the floating seat 46 in contact with the shoulder 44. As a result, all force on the seat 48 is exerted by the seat spring 52 rather than the adjusting spring 76. This reduces the tendency for seat damage.

Thus, in accordance with the invention, a combination hydraulic pressure regulator and pressure switch uses a hydraulically balanced, floating seat, which forces a measurable amount of seat movement prior to the pressure regulator losing any pressure or flow.

I claim:

1. A combination hydraulic pressure regulator and pressure switch comprising:

a housing having an interior chamber connecting an inlet port to an outlet port;

a seating device movably received in the interior chamber and having a seat surrounding an opening, the opening being in communication with the outlet port;

a poppet movable in said interior chamber;

an adjustment spring for normally urging said poppet into engagement with the seat to close said opening, said poppet being movable in a direction away from the seat in response to hydraulic pressure in the interior chamber sufficient to overcome force of the adjustment spring;

switch actuator means associated with the poppet for actuating a limit switch in response to movement of the poppet in a direction away from the seat; and balancing means for hydraulically balancing the seating device in the chamber so that the seat remains engaged with the poppet until a select pressure is exceeded in the interior chamber thereafter resulting in hydraulic flow from the inlet port to the outlet port.

2. The combination hydraulic pressure regulator and pressure switch of claim 1 wherein said seating device is movable between opposite first and second shoulders in the interior chamber.

3. The combination hydraulic pressure regulator and pressure switch of claim 2 wherein balancing means prevents said seating device from engaging said first shoulder so that force of the adjusting spring is not exerted against the seating device.

4. The combination hydraulic pressure regulator and pressure switch of claim 2 wherein said second shoulder limits movement of the seating device so that when the select pressure is exceeded the poppet is spaced from the seat resulting in hydraulic flow from the inlet port to the outlet port.

5. The combination hydraulic pressure regulator and pressure switch of claim 1 wherein said balancing means comprises a spring biasing the seating device in a direction toward said poppet.

6. The combination hydraulic pressure regulator and pressure switch of claim 1 further comprising an adapter receivable in the interior chamber and having a through bore defining the outlet port, the adapter having an elongate seat guide end supporting the seating device in the interior chamber.

7. The combination hydraulic pressure regulator and pressure switch of claim 6 wherein said seating device comprises a tubular body telescopically received on the seat guide.

8. The combination hydraulic pressure regulator and pressure switch of claim 7 further comprising a seal between said tubular body and said seat guide.

9. The combination hydraulic pressure regulator and pressure switch of claim 1 wherein said switch actuator means comprises a spring guide disposed between said poppet and said adjustment spring for movement with said poppet, said spring guide having a protruding pin for selectively engaging an actuator on said limit switch.

10. The combination hydraulic pressure regulator and pressure switch of claim 1 further comprising means for adjusting force of the adjustment spring.

11. A combination hydraulic pressure regulator and pressure switch comprising:

a housing having an interior chamber connecting an inlet port to an outlet port;

a floating seating device received in the interior chamber and having a seat surrounding an opening, the opening being in communication with the outlet port;

a poppet movable in said interior chamber;

an adjustment spring for normally urging said poppet into engagement with the seat to close said opening, said poppet being movable in a direction away from the seat in response to hydraulic pressure in the interior chamber sufficient to overcome force of the adjustment spring;

switch actuator means associated with the poppet for actuating a limit switch in response to movement of the poppet in a direction away from the seat; and biasing means for biasing the sealing device toward the poppet so that the seat remains engaged with the poppet to prevent loss of hydraulic pressure until a select pressure is exceeded in the interior chamber thereafter resulting in hydraulic flow from the inlet port to the outlet port.

12. The combination hydraulic pressure regulator and pressure switch of claim 11 wherein said seating device is movable between opposite first and second shoulders in the interior chamber.

13. The combination hydraulic pressure regulator and pressure switch of claim 12 wherein biasing means prevents said seating device from engaging said first shoulder so that force of the adjusting spring is not exerted against the seating device.

14. The combination hydraulic pressure regulator and pressure switch of claim 12 wherein said second shoulder limits movement of the seating device so that when the select pressure is exceeded the poppet is spaced from the seat resulting in hydraulic flow from the inlet port to the outlet port.

15. The combination hydraulic pressure regulator and pressure switch of claim 11 wherein said biasing means comprises a spring biasing the seating device in a direction toward said poppet.

16. The combination hydraulic pressure regulator and pressure switch of claim 11 further comprising an adapter receivable in the interior chamber and having a through bore defining the outlet port, the adapter having an elongate seat guide end supporting the seating device in the interior chamber.

17. The combination hydraulic pressure regulator and pressure switch of claim 16 wherein said seating device comprises a tubular body telescopically received on the seat guide.

18. The combination hydraulic pressure regulator and pressure switch of claim 17 further comprising a seal between said tubular body and said seat guide.

19. The combination hydraulic pressure regulator and pressure switch of claim 11 wherein said switch actuator means comprises a spring guide disposed between said poppet and said adjustment spring for movement with said poppet, said spring guide having a protruding pin for selectively engaging an actuator on said limit switch.

20. The combination hydraulic pressure regulator and pressure switch of claim 11 further comprising means for adjusting force of the adjustment spring.

* * * * *